(12) United States Patent
Uchida

(10) Patent No.: US 9,186,922 B2
(45) Date of Patent: Nov. 17, 2015

(54) RECORDING APPARATUS AND IMAGE PROCESSING METHOD

(71) Applicant: CANON KABUSHIKI KIASHA, Tokyo (JP)

(72) Inventor: Naoki Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/863,915

(22) Filed: Apr. 16, 2013

(65) Prior Publication Data

US 2013/0286080 A1 Oct. 31, 2013

(30) Foreign Application Priority Data

Apr. 27, 2012 (JP) ................................. 2012-102479

(51) Int. Cl.
*B41J 29/393* (2006.01)
*H04N 1/60* (2006.01)

(52) U.S. Cl.
CPC .............. *B41J 29/393* (2013.01); *H04N 1/6033* (2013.01)

(58) Field of Classification Search
CPC ................................ B41J 29/393; B41J 29/40
USPC ............................................................ 347/19
See application file for complete search history.

(56) References Cited

U.S. PATENT DOCUMENTS

| 6,876,467 | B1 * | 4/2005 | Yamaguchi | 358/1.9 |
| 2008/0007587 | A1 * | 1/2008 | Watanabe | 347/19 |
| 2009/0238976 | A1 * | 9/2009 | Ishii et al. | 427/256 |
| 2011/0141183 | A1 * | 6/2011 | Takeishi | 347/19 |

FOREIGN PATENT DOCUMENTS

JP 9-171279 A 6/1997

* cited by examiner

*Primary Examiner* — Jason Uhlenhake
(74) *Attorney, Agent, or Firm* — Canon USA Inc. IP Division

(57) ABSTRACT

A recording apparatus includes a recording head for performing recording on a recording medium by applying a recording material to the recording medium, a measurement unit configured to read a patch recorded on the recording medium by the recording head and to optically measure a density of the patch, an acquisition unit configured to acquire information on an optical characteristic of the measurement unit and a reference optical characteristic, and a determination unit configured to determine an amount by which the recording material is to be applied from the recording head, based on the density measured by the measurement unit and the information acquired by the acquisition unit.

19 Claims, 13 Drawing Sheets

RECORDING APPARATUS AND IMAGE PROCESSING METHOD

BACKGROUND OF THE INVENTION

1. Field of the Invention

The present invention relates to a recording apparatus and an image processing method.

2. Description of the Related Art

Inkjet printing apparatuses record an image by discharging a plurality of ink droplets that form the image from an inkjet head onto a recording medium. Each of the plurality of ink droplets is expected to be discharged according to a predetermined desired discharge amount. In some cases, due to various kinds of errors included in the printing apparatus, such as an error when the ink or the head is manufactured, the volume of an ink droplet discharged from the print head may be different from the original desired amount, affecting the density of a recorded product. Therefore, recording a test pattern by the printing apparatus, detecting the recorded density by a sensor including a light emitting portion and a light receiving portion, and correcting image data in such a manner that a recorded image has a desired density have been conducted. However, there is a variation in the optical characteristics of the light emitting portion and the light receiving portion among sensors. A reading result of the sensor affects the density of a recorded product in this correction, so that it is important to secure the reading accuracy of the sensor in advance.

Japanese Patent Application Laid-Open No. 9-171279 discusses a method for calibration of a reading sensor. According to this method, a reference chart is read, and correction data is generated based on a difference from a target to correct a variation in a spectral characteristic of a color filter of a color scanner.

However, according to the method using the reference chart, the chart is required every time the correction is performed. Further, this method has a problem of its lack of simpleness, since a variation in the chart and a change due to aging should be taken into consideration.

SUMMARY OF THE INVENTION

The present invention is directed to an apparatus and a method capable of easily correcting a variation in an optical characteristic of a unit for measuring a test pattern.

According to an aspect of the present invention, a recording apparatus includes a recording head for performing recording on a recording medium by applying a recording material to the recording medium, a measurement unit configured to read a patch recorded on the recording medium by the recording head and to optically measure a density of the patch, an acquisition unit configured to acquire information on an optical characteristic of the measurement unit and a reference optical characteristic, and a determination unit configured to determine an amount by which the recording material is to be applied from the recording head, based on the density measured by the measurement unit and the information acquired by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
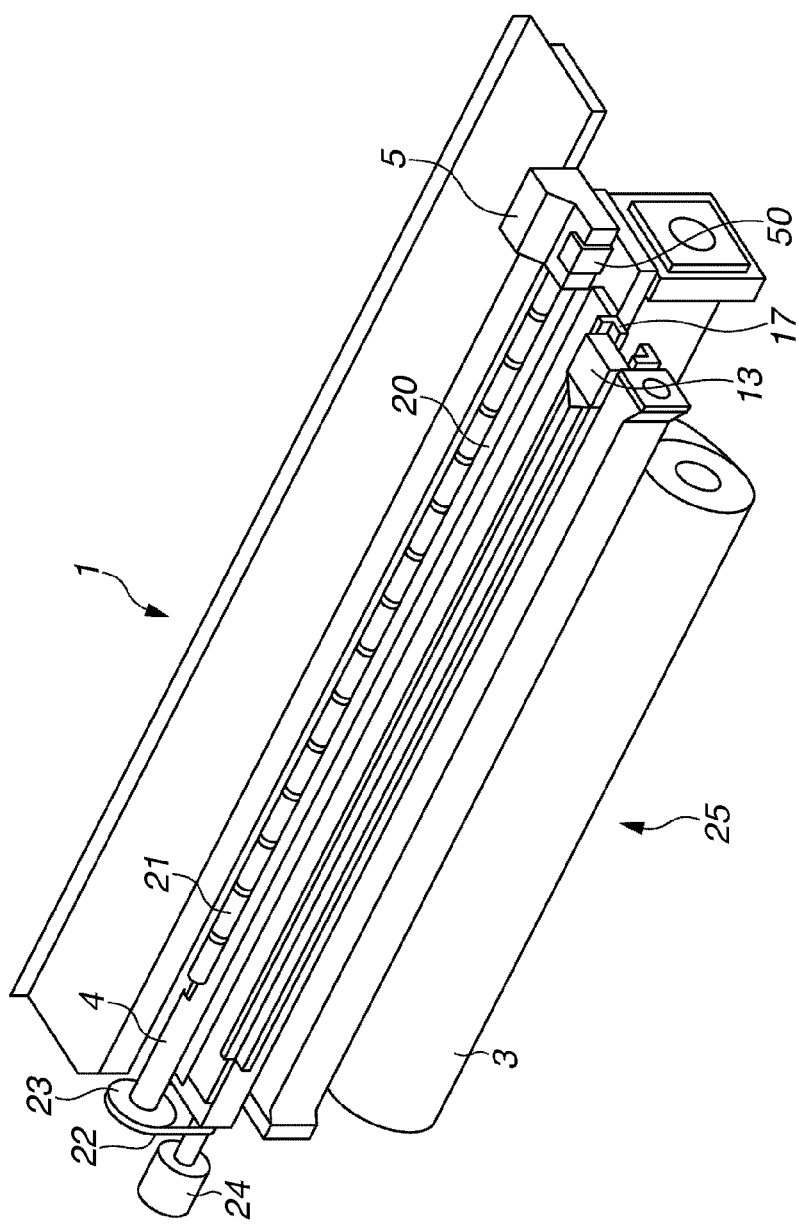
FIG. 1 is a perspective view illustrating an inkjet recording apparatus according to an exemplary embodiment of the present invention.
Figure 6A:
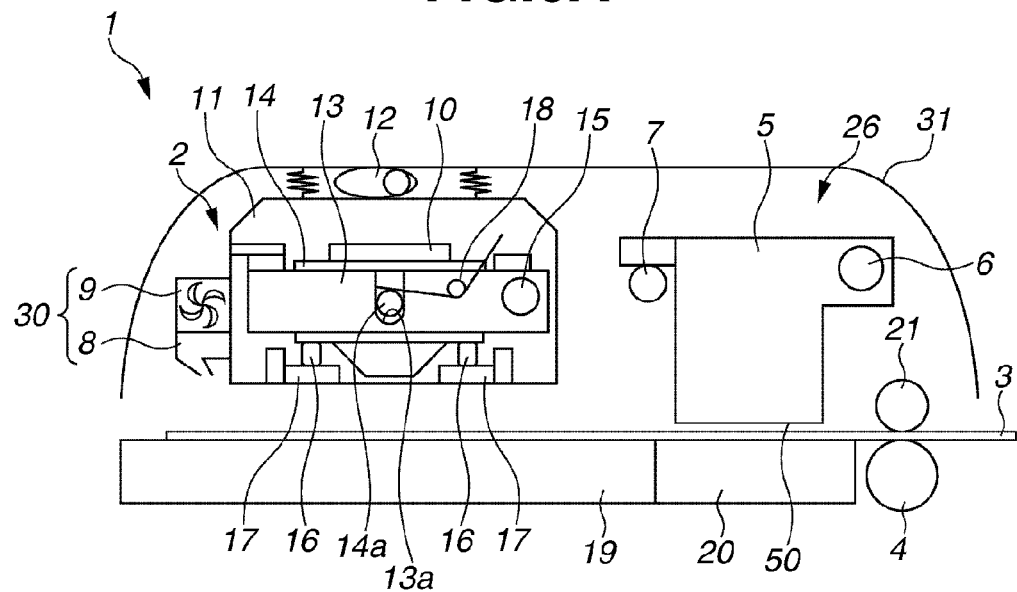
FIGS. 6A and 6B are schematic cross-sectional views illustrating the inkjet recording apparatus according to the exemplary embodiment of the present invention.

Configurations of an inkjet recording apparatus 1 and a colorimetric device 2 according to an exemplary embodiment of the present invention will be described. FIG. 1 is a partially exploded perspective view illustrating an internal configuration of the inkjet recording apparatus 1 provided with the colorimetric device 2 according to the exemplary embodiment of the present invention. Further, FIG. 6A is a schematic cross-sectional view illustrating the inkjet recording apparatus 1.

A sheet (roll paper) wound into a rolled state as a sheet of a recording medium is used in the inkjet recording apparatus 1. While one end of the wound roll paper is conveyed, ink is discharged from a recording head 50, which is an ink discharge head, onto the sheet 3, thereby recording an image. The inkjet recording apparatus 1 includes a platen 20, which supports the sheet 3 in a planar state. In the present exemplary embodiment, a conveyance roller 4 and a pinch roller 21 are disposed within the inkjet recording apparatus 1 as a conveyance mechanism that conveys the sheet 3. A conveyance motor 24 is connected to the conveyance roller 4 via a conveyance belt 22 and a conveyance pulley 23. The conveyance pulley 23 is fixed to a shaft of the conveyance roller 24. When the conveyance motor 24 is driven, a driving force by the conveyance motor 24 is transmitted to the conveyance pulley 23 via the conveyance belt 22. The rotational driving force transmitted to the conveyance pulley 23 is transmitted to the conveyance roller 4, whereby the conveyance roller 4 is rotationally driven. The leading edge of the roll paper 3 is wound off from a roll paper feeding unit 25 by the rotational driving of the conveyance roller 4 with the leading edge of the roll paper 3 sandwiched and nipped between the conveyance roller 4 and the pinch roller 21.

In the inkjet recording apparatus 1 according to the present exemplary embodiment, an image forming unit 26 includes the recording head 50, a recording carriage 5, and the platen 20. The recording carriage 5 with the recording head 50 mounted thereon is disposed at an opposite position from the platen 20 in the inkjet recording apparatus 1. The recording carriage 5 is configured to perform a reciprocal scanning operation along guide members 6 and 7 in a direction perpendicular to a direction in which the sheet 3 is conveyed.

The inkjet recording apparatus 1 includes the recording head 50 capable of discharging ink. The recording head 50 can vertically move the recording head 50 relative to the platen 20 according to the type of a sheet and an environment in which the inkjet recording apparatus 1 is used. The recording head 50 records the image on the sheet 3 by discharging the ink at a predetermined position of the sheet 3 based on image information. A discharge port array is formed by a plurality of discharge ports arrayed at predetermined pitches on a discharge surface of the recording head 50 opposite the sheet 3. In a case where inks of a plurality of colors are used for, for example, color recording, a plurality of discharge port arrays corresponding to the respective ink colors is formed. A heating element (an electrothermal converter) is provided in a flow path in the recording head 50 to correspond to each of the discharge ports. The heating element is energized via a wiring to generate heat energy, so that the ink in the flow path is heated to bubble due to film boiling. An ink droplet is discharged from the discharge port due to bubbling energy at this time. For recording, a recording operation, in which the ink is discharged toward a recording region of the sheet 3 on the platen 20 while the recording head 50 moves in a main scanning direction, and a conveyance operation, in which the sheet 3 is conveyed in a sub-scanning direction by a distance corresponding to a recording width of the sheet 3, are repeated. Images are sequentially recorded on the sheet 3 by a repetition of these operations. The recording head 50 according to the present exemplary embodiment operates based on the method for discharging an ink droplet by causing film boiling to bubble the ink using the heating element, but the exemplary embodiment of the present invention is not limited thereto. A recording head based on a method for discharging liquid in the recording head by deforming a piezoelectric element may be employed to the recording apparatus. Further, another type of recording head may be employed to the recording apparatus according to the exemplary embodiment of the present invention.

Next, the configuration of the colorimetric device 2 provided with the inkjet recording apparatus 1 according to the present exemplary embodiment will be described. The colorimetric device 2 includes a colorimetric sensor 10. Further, the colorimetric device 2 includes a colorimetric carriage 13. A colorimetric sensor holder 14 is mounted on the colorimetric carriage 13, and the colorimetric sensor 10 is attached to the colorimetric sensor holder 14. The colorimetric sensor 10 can perform colorimetry on the recorded image recorded on the sheet 3.

The colorimetric sensor 10 is disposed at a downstream side relative to the recording head 50 in the direction in which the sheet 3 is conveyed. The colorimetric sensor 10 is mounted on the colorimetric carriage 13, which is configured to perform a scanning operation in the main scanning direction intersecting with (in the present exemplary embodiment, in the direction approximately perpendicular to) the direction in which the sheet 3 is conveyed. The colorimetric sensor 10 moves in the main scanning direction according to a movement of the colorimetric carriage 13 in the main scanning direction. In this manner, the colorimetric sensor 10 can perform the colorimetry on a test pattern recorded on the sheet 3 while scanning the test pattern in the main scanning direction. The colorimetric device 2 includes the colorimetric carriage 13, as a scanning unit, for moving the colorimetric sensor 10 relative to the sheet 3 to scan the image, and a scanning mechanism of the colorimetric carriage 13.

Further, the inkjet recording apparatus 1 includes a support member 19 for supporting the sheet 3 at a position corresponding to the colorimetric device 2. The colorimetric device 2 can perform the colorimetry on the recorded image recorded on the sheet 3 with the sheet 3 supported on the support member 19.

The colorimetric sensor 10 includes a light emitting element used as a light source such as a light-emitting diode (LED). Further, the colorimetric sensor 10 includes a light receiving element capable of receiving light such as a photodiode. During execution of colorimetry, light is emitted from the light emitting element toward the sheet 3. The emitted light is reflected on the recoded image of the sheet 3, and the reflected light therefrom is received by the light receiving element. Then, color information, such as an optical density, of the recorded image can be measured based on a light amount received by the light receiving element.

The colorimetric carriage 13 is pivotally supported by a guide rail 15. Further, the colorimetric carriage 13 is configured to perform a reciprocal scanning operation in a direction in which the guide rail 15 extends by not-illustrated driving source and driving belt. As a result, it is possible to maintain a constant relative distance and a constant relative angle between the colorimetric sensor 10 and the sheet 3. Therefore, it is possible for the colorimetric sensor 10 to accurately perform the colorimetry.

Further, the colorimetric device 2 includes a pressing member 17. The pressing member 17 is disposed in such a manner to be able to contact the sheet 3 to press a recording surface of the sheet 3 from above during the execution of colorimetry. Since the sheet 3 is pressed against a support surface during the execution of colorimetry, the constant distance between the colorimetric sensor 10 and the sheet 3 can be maintained even if a winding or a curl is generated on the sheet 3. Thus, the colorimetry can be accurately performed. Further, during the execution of colorimetry, the colorimetric sensor 10 is guided in the scanning direction by the guide rail 15. Further, four wheels (contacting members) 16 are attached to a bottom of the colorimetric sensor holder 14. When the colorimetric sensor 10 scans an image, the wheels 16 attached to the colorimetric sensor 10 contact a top of the pressing member 17. The wheels 16 rotate and roll on the pressing member 17 while contacting the pressing member 17, so that the colorimetric carriage 13 moves.

The colorimetric sensor holder 14 includes a rotational shaft 14a that extends in parallel with the scanning direction, in which the colorimetric sensor 10 scans an image. On the other hand, U-shaped elongated holes 13a are formed on both side surfaces of the colorimetric carriage 13. The colorimetric sensor holder 14 is disposed to extend perpendicularly to the scanning direction of the colorimetric carriage 13. The colorimetric sensor holder 14 and the colorimetric carriage 13 are engaged with each other with the rotational shaft 14a disposed within the elongated holes 13a. The rotational shaft 14a is disposed to be vertically movable along the elongated holes 13a. Therefore, the colorimetric sensor holder 14 is disposed to be movable toward or away from the sheet 3 relative to the colorimetric carriage 13. A pressing spring 18 is disposed at the colorimetric carriage 13, and presses the colorimetric sensor holder 14 against the pressing member 17 via the wheels 16. While the colorimetric sensor holder 14 is urged downward by the colorimetric carriage 13 via the pressing spring 18, the wheels 16 contact the pressing member 17. Therefore, the colorimetric sensor 10 is urged toward the sheet 3, and the colorimetric sensor holder 14 can perform scanning according to a shape of a surface of the pressing member 17.

Further, the colorimetric sensor holder 14 is urged downward by the pressing spring 18, so the wheels 16 can press the sheet 3 against the support member 19 via the pressing member 17 during the execution of colorimetry. In other words, the wheels 16 are urged toward the sheet 3 and roll while contacting the pressing member 17, so that the colorimetric sensor 10 moves relative to the sheet 3 to scan the image. Therefore, it is possible for the colorimetric device 2 to hold the sheet 3 from above, and to prevent the sheet 3 from floating from the support member 19 during the execution of colorimetry. When the wheels 16 does not contact the pressing member 17, the sheet 3 is pressed only by the weight of the pressing member 17.

Figure 6B:
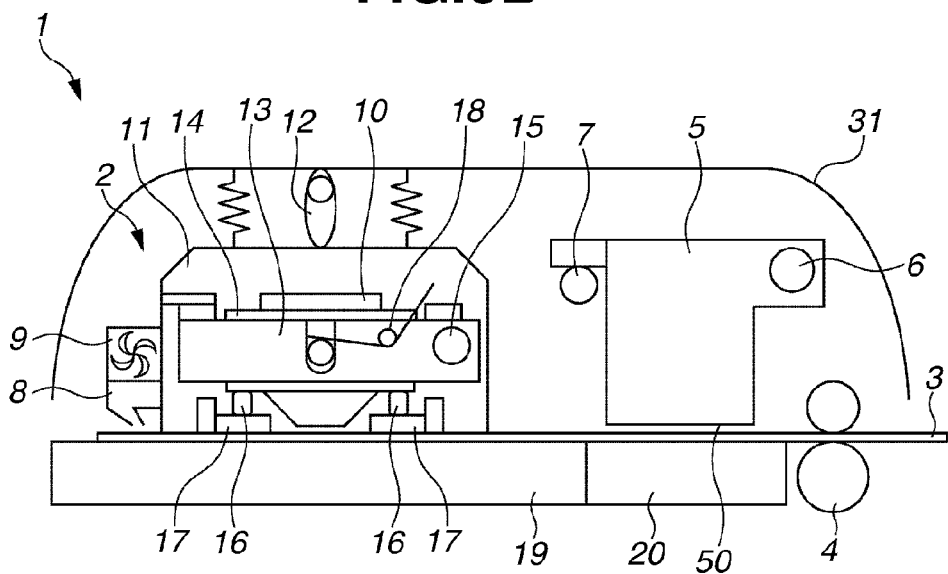

Further, the colorimetric device 2 includes a colorimetric device frame 11 that stores the colorimetric sensor holder 14 and the pressing member 17. The colorimetric device frame 11 is attached to a housing 31 on a main body side of the inkjet recording apparatus 1 via a spring. Further, an elevating cam 12 is rotatably attached to the housing 31 on the main body side of the inkjet recording apparatus 1. A rotation of the elevating cam 12 can cause the colorimetric device 2 to move toward or away from the housing 31. FIG. 6B is a cross-sectional view illustrating the inkjet recording apparatus 1 when the rotation of the elevating cam 12 causes the colorimetric device 2 to move away from the housing 31, and thus the colorimetric device 2 moves toward the sheet 3. When the colorimetry is performed on the recorded image recorded on the sheet 3 by the colorimetric sensor 10, the colorimetric sensor 10 is moved to be positioned close to sheet 3 by the rotation of the elevating cam 12, and in this state, the colorimetry can be performed.

Figure 2:
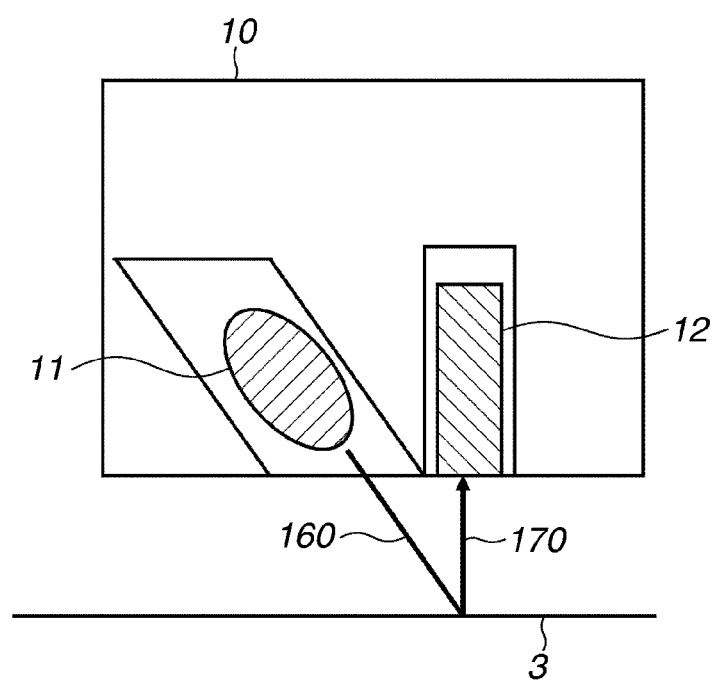
FIG. 2 is a schematic cross-sectional view illustrating a colorimetric sensor according to the exemplary embodiment of the present invention.

FIG. 2 is a schematic cross-sectional view illustrating the colorimetric sensor 10.

The colorimetric sensor 10 includes a light emitting portion 11 and a light receiving portion 12. A light beam 160 emitted from the light emitting portion 11 is reflected on the surface of the sheet 3, which is a recording medium. There are specular reflection and irregular reflection as the reflected light, and it is desirable to detect irregular reflection light 170 to more accurately detect the density of the image formed on the sheet 3. Therefore, the light receiving portion 12 is disposed to be able to receive light with a reflection angle different from an angle at which the light is incident from the light emitting portion 11. A detected and acquired detection signal is transmitted to an electric substrate of the printer.

In the present exemplary embodiment, a white LED or a three-color LED is used as the light emitting portion 11, and a photoelectric conversion element sensitive to a visual light range is used as the light receiving portion 12, to adjust registration for the recording head 50 that discharges all types of inks including main color inks, such as Cyan (C), Magenta (M), Yellow (Y), and Black (K), and special color inks. However, in detection of a relationship between a relative recorded position and a density of each color recorded in an overlapped manner, for adjustment among different colors, it is more effective to use the three-color LED, which allows a selection of a color corresponding to a high detection sensitivity. Further, it is more effective to select an element, in which a dark current is little, for the light receiving portion 12 since this can increase a detection sensitivity for a high density.

Regarding the detection resolution of the colorimetric sensor 10, the present exemplary embodiment may be realized as long as the detection resolution is high enough to detect a relative density difference among the respective patterns (a single pattern included in an adjustment pattern group will be hereinafter referred to as a "patch") belonging to the adjustment pattern group, which will be described below.

Further, regarding the detection stability of the colorimetric sensor 10, the present exemplary embodiment may be realized as long as detection of the colorimetric sensor 10 is stable enough not to affect the detected density difference before the colorimetric sensor 10 completes detecting all of the patches in the adjustment pattern group. The sensitivity is adjusted, for example, after the colorimetric device 2 is moved to a non-recording region of the sheet 3. As the adjustment method, the light emitting strength of the light emitting portion 11 is adjusted in such a manner that the detection level reaches an upper limit value. Alternatively, another possible method is to adjust a gain of a detection amplifier in the light receiving portion 12. The sensitivity does not necessarily have to be adjusted, but the sensitivity adjustment is effective as a method for improving a signal-to-noise (S/N) ratio to increase the detection accuracy.

It is desirable that the spatial resolution of the colorimetric sensor 10 is a resolution allowing detection of a region smaller than a region where a single adjustment pattern is printed. In a case where two pattern groups are printed in such a manner to be adjacent to each other in the direction perpendicular to the main scanning direction in multi-pass printing, a printing width in the sub-scanning direction reduces according to the number of passes, so the resolution of the colorimetric sensor 10 is limited by the number of printing passes. Further, the number of printing passes (the printing width) for printing the adjustment pattern may be determined from the resolution of the colorimetric sensor 10.

Figure 3:
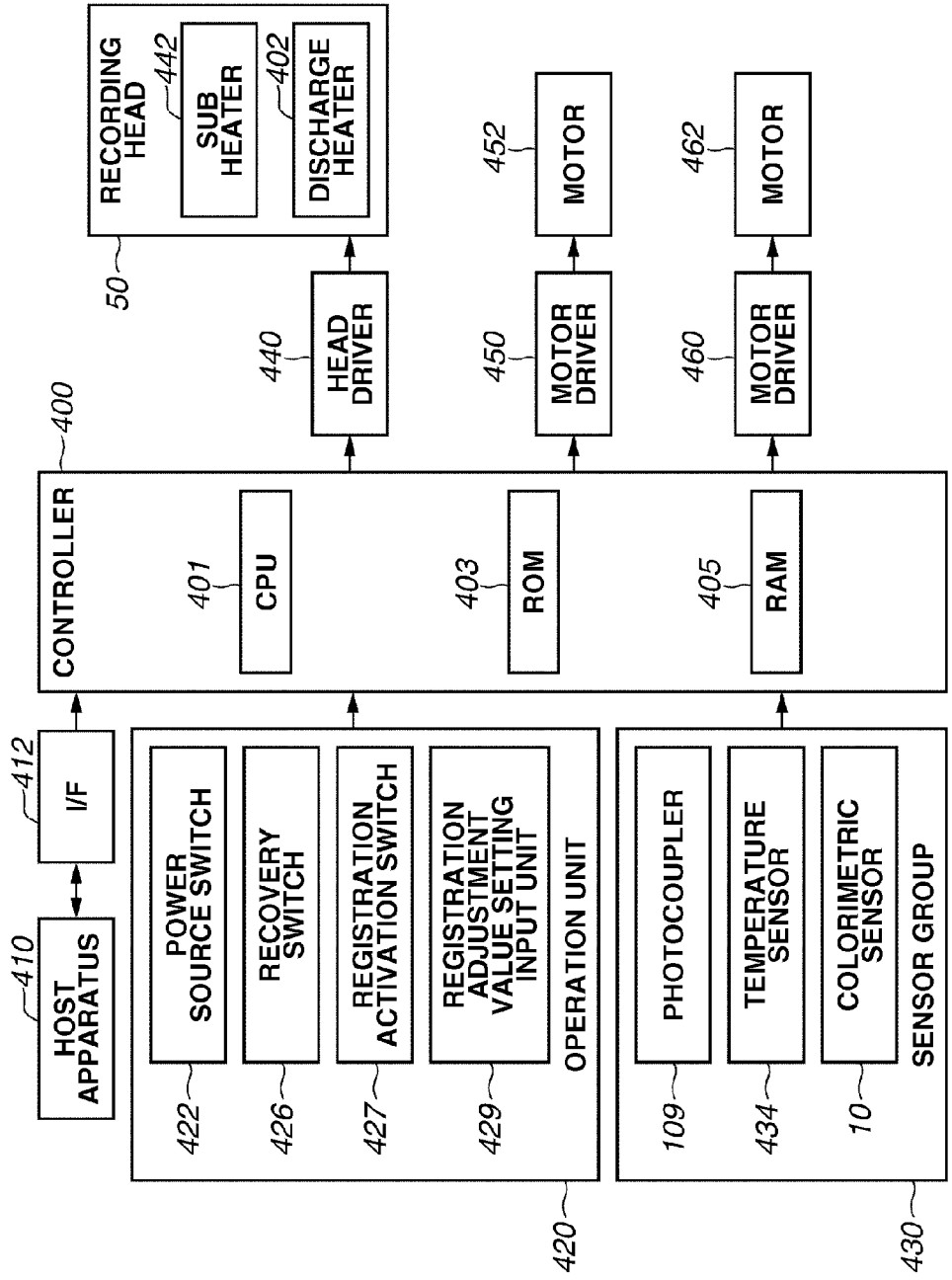
FIG. 3 is a block diagram schematically illustrating a control circuit of the inkjet recording apparatus according to the exemplary embodiment of the present invention.

FIG. 3 is a schematic block diagram illustrating a control circuit of a color inkjet printer according to the first exemplary embodiment.

A controller 400 is a main control unit, and includes a central processing unit (CPU) 401 in the form of, for example, a microcomputer, a read-only memory (ROM) 403 storing a program, a required table, and other fixed data, and a random access memory (RAM) 405 including, for example, an area where image data is developed and a working area. A host apparatus 410 is a supply source of image data. More specifically, the host apparatus 401 may be embodied in the form of not only a computer that, for example, generates and processes data such as an image regarding printing, but also a reader unit for image reading, and the like. The image data, another command, a status signal, and others are transmitted to and received from the controller 400 via an interface (I/F) 412.

An operation unit 420 is a switch group that receives an instruction input by an operator. The operation unit 420 includes a power source switch 422, and a recovery switch 426 for instructing activation of suction recovery. Further, the operation unit 420 includes a registration adjustment activation switch 427 for manually adjusting registration, a registration adjustment value setting input unit 429 for manually inputting an adjustment value of the registration, and others.

A sensor group 430 is a sensor group for detecting the status of the apparatus, and includes the above-described reflective colorimetric sensor 10, a photocoupler 109 for detecting a home position, a temperature sensor 434 disposed at an appropriate position to detect an ambient temperature, and others.

A head driver 440 is a driver configured to drive a discharge heater in the recording head 50 according to, for example, print data. The head driver 440 includes a shift register for aligning the print data in such a manner to correspond to the position of the discharge heater, and a latch circuit for latching information at appropriate timing. Further, the head driver 440 includes a timing setting unit for appropriately setting driving timing (discharge timing) for aligning dot forming positions, and others, in addition to a logic circuit element for actuating the discharge heater in synchronization with a driving timing signal.

A sub heater is included in the recording head 50. The sub heater adjusts a temperature to stabilize the discharge characteristic of ink, and may be formed on a print head substrate together with the discharge heater and/or may be attached to a print head main body or a head cartridge.

A motor driver 450 is a driver for driving a main scanning (carriage) motor 452. A sub-scanning (linefeed (LF)) motor 462 is a motor used to convey (sub-scan) a print medium. A motor driver 460 is a driver for the sub-scanning motor 462.

In the following description, a method for correcting a density to be recorded will be described as an image processing method according to the present exemplary embodiment of the present invention.

Figure 4:
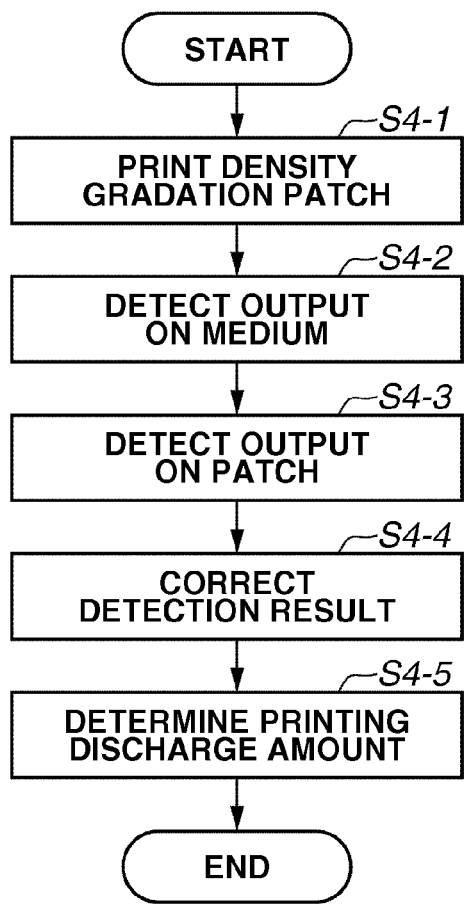
FIG. 4 is a flowchart illustrating a method for correcting a discharge amount according to the exemplary embodiment of the present invention.

FIG. 4 is a typical flowchart illustrating the present exemplary embodiment of the present invention.

Figure 5A:
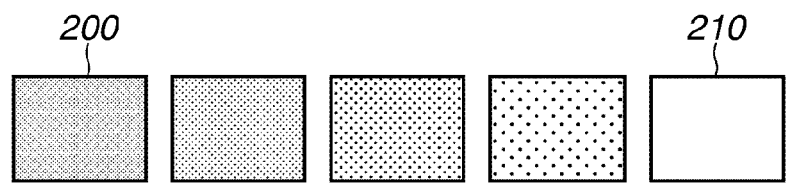
FIGS. 5A and 5B are schematic views each illustrating an example of a density gradation detection patch group according to the exemplary embodiment of the present invention.
Figure 5B:
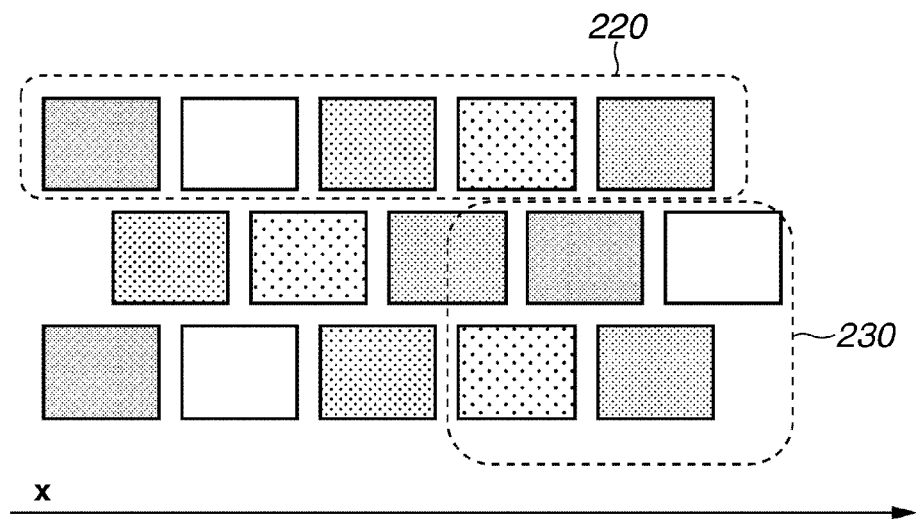

First, in step S4-1, the inkjet recording apparatus 1 prints patches for detecting densities of each color on a recording medium. The inkjet recording apparatus 1 prints gradation patches for each ink color based on predetermined input values. The input values may be different for each ink color. For example, for a light color, high input values are set to increase the detection sensitivity. Further, the input values of the gradation patches do not necessarily have to be uniform gradations. Especially, ink of a dark color results in saturation of a printing result in a region to which a high input value is set, so it is effective to increase the number of patches with a low gradation. FIG. 5A illustrates an example of a density gradation detection patch group. A patch 200 corresponds to a high input value, and a patch 210 corresponds to a low input value. A high input value leads to an increase in the number of discharged droplets, resulting in a high printing duty. The density gradation detection patches may be disposed at any position of the recording medium. It is desirable to arrange patterns with a blank space left between the patterns to prevent the sheet from being wet to undulate, to stabilize the detection result. FIG. 5B is a schematic view illustrating a layout of a density gradation detection patch group. A print patch group 220 is arranged in an X direction of the scanning direction of the colorimetric carriage 13 and the recording carriage 5. A print patch group 230 includes the conveyance direction. Cockling is such a phenomenon that a large amount of liquid droplets swells a recording medium to displace the recording medium from the platen 20, resulting in generation of undulation. Therefore, it is effective to arrange the patterns in such a manner to reduce an amount of liquid droplets in a predetermined area. In the example indicated as the print patch group 220, dark patches and light patches are alternately disposed in the carriage scanning direction. Further, in the example indicated as the print patch group 230, the patches themselves are arranged in a staggered manner, and dark patches and light patches are vertically alternately disposed. That reduces an amount of liquid droplets in the predetermined area.

Next, in step S4-2, the inkjet recording apparatus 1 detects an output on the recording medium. The result of the detection on the recording medium is used as a reference of a white level. It is desirable to detect the output on the recording medium in a same condition as printed gradation patches to reduce a detection variation of the colorimetric sensor 10. For example, a difference in positions in the carriage direction changes a distance between the colorimetric sensor 10 and the sheet, affecting the detection result. Therefore, it is desirable to detect the output on the recording medium at the same position as the carriage position direction. Further, as described above, it is desirable to calibrate the output of the colorimetric sensor 10 according to the white level. The colorimetric sensor 10 is set in such a manner that a width of an analog to digital (AD) detection range of hardware is maximized based on the white level to increase a dynamic range of detection.

Figure 7:
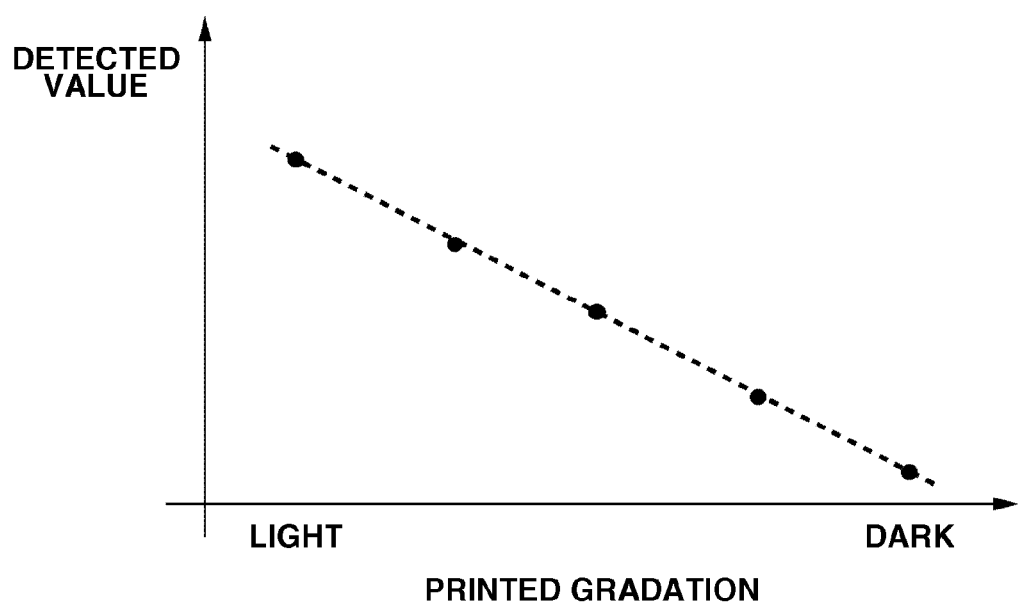
FIG. 7 is a graph illustrating a result of detection of density gradation detection patches.

Next, in step S4-3, the inkjet recording apparatus 1 detects outputs on the patches. The inkjet recording apparatus 1 detects the gradation patches printed on the recording medium using the setting of the colorimetric sensor 10, which is used in detection on the medium. FIG. 7 schematically illustrates a result of the detection of the density gradation detection patches. FIG. 7 is a graph in which detected values corresponding to the printed gradation values are plotted. In a case where the inkjet recording apparatus 1 employs such a circuit configuration that an output level is set high for the white level, a patch of a small input value (a patch printed with a low density) corresponds to a large detected value, and a patch of a large input value (a patch printed with a high density) corresponds to a small detected value.

Figure 8:
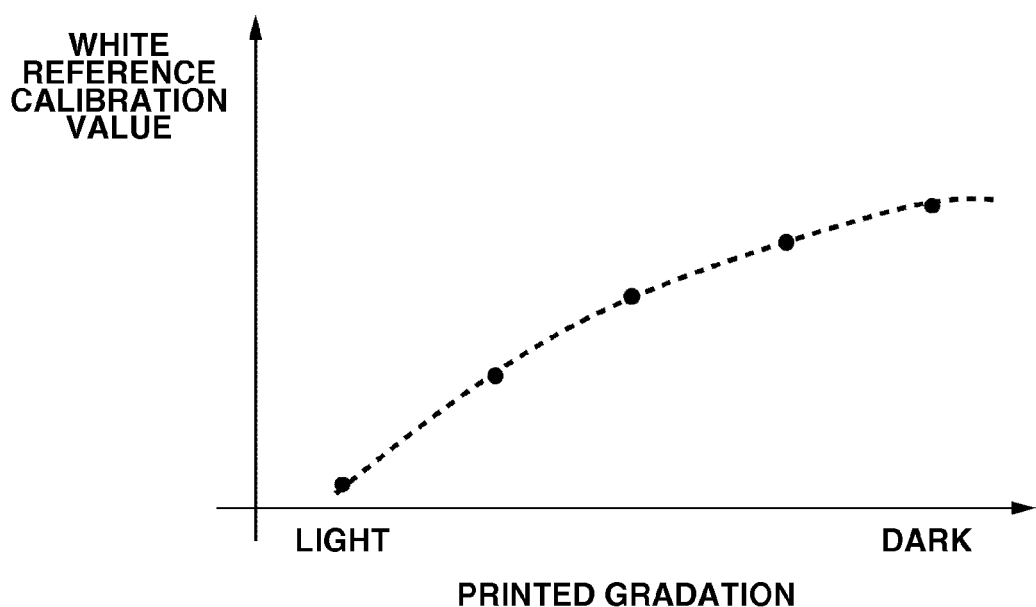
FIG. 8 is a graph illustrating a result of white surface calibration made to the result of the detection of the density gradation detection patches.

FIG. 8 schematically illustrates a result of white surface calibration performed on the result of the detection of the density gradation detection patches. The result of the detection of the density gradation detection patches is calibrated using the output on the recording medium, thereby performing white surface calibration. Use of the result can reduce an influence of a variation in the white level of the recording medium.

Next, in step S4-4, the inkjet recording apparatus 1 corrects the detection result.

Figure 9:
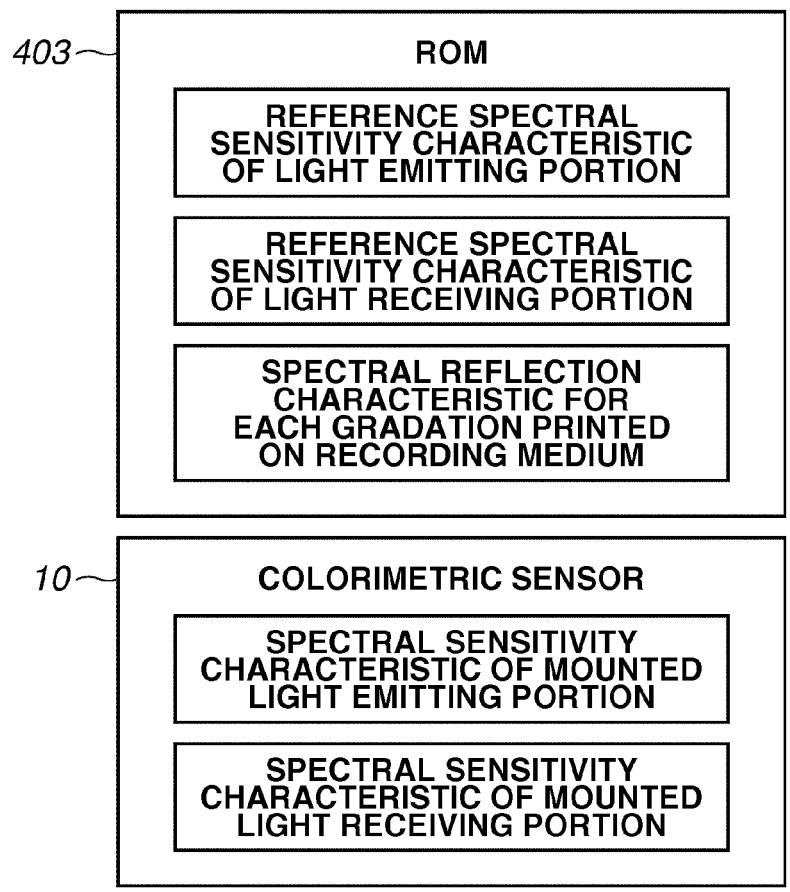
FIG. 9 is a conceptual diagram illustrating storage of information in a read-only memory (ROM) of the recording apparatus and a colorimetric sensor according to the exemplary embodiment of the present invention.
Figure 10:
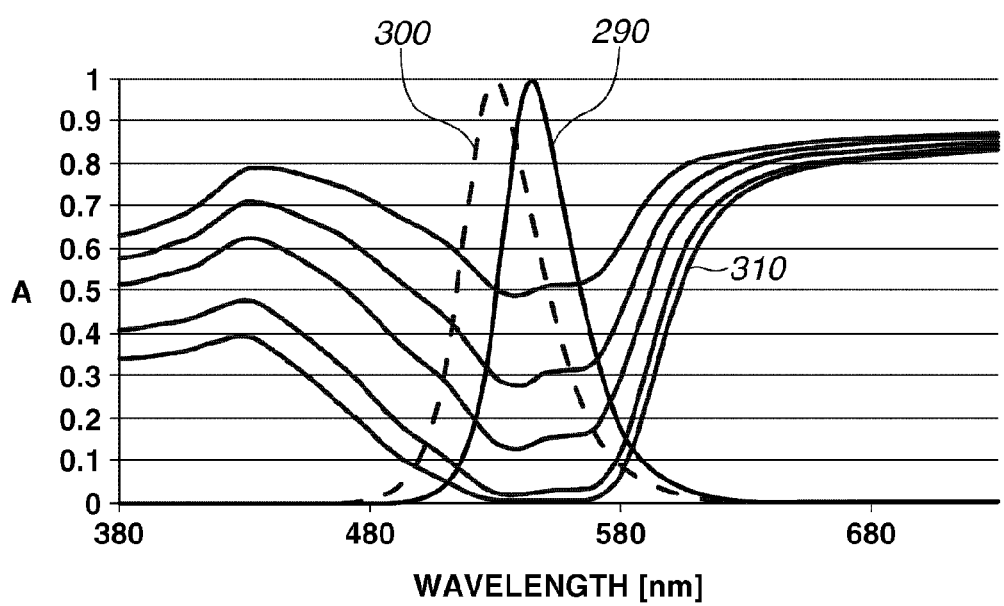
FIG. 10 is a graph illustrating an influence of a variation in spectral sensitivity.
Figure 11:
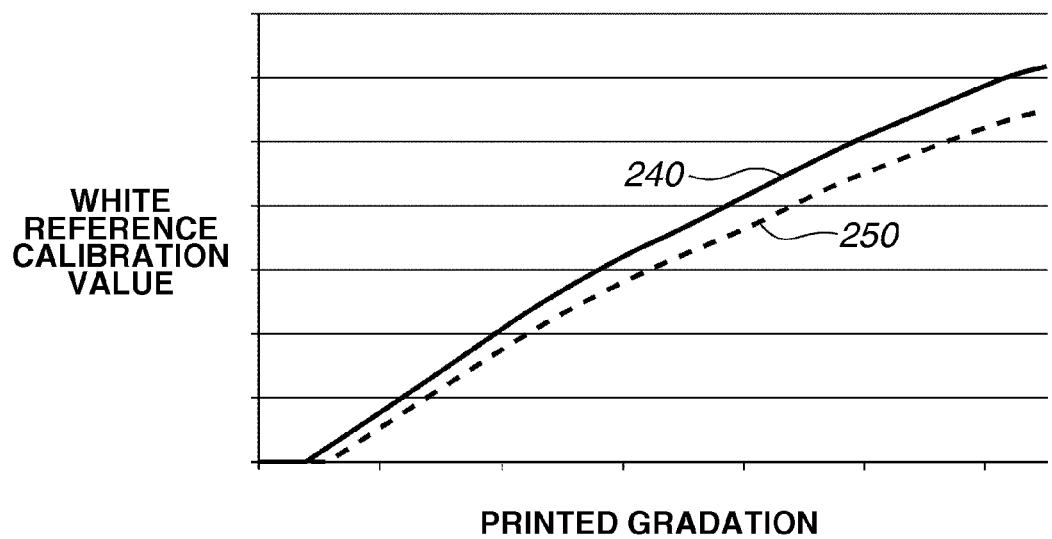
FIG. 11 is a graph illustrating an influence of a variation in spectral sensitivity.

The inkjet recording apparatus 1 corrects the result of the detection of the density gradation detection patches after the white surface calibration. The spectral sensitivity characteristics of the light emitting portion and the light receiving portion 12 mounted on the colorimetric sensor 10 vary for each colorimetric sensor. Further, a patch printed on a recording medium also has a spectral reflection characteristic. FIG. 10 schematically illustrates spectral sensitivities out of alignment. A vertical axis A in FIG. 10 indicates a relative sensitivity, and has no unit of quantity. A line 290 indicates an element spectral sensitivity characteristic A (a spectral sensitivity characteristic of a first colorimetric sensor). A line 300 indicates an element spectral sensitivity characteristic B (a spectral sensitivity characteristic of a colorimetric sensor different from the first colorimetric sensor). A line 310 indicates a spectral reflection characteristic of ink printed on the recording medium. The spectral sensitivity characteristic varies depending on an employed colorimetric sensor. Therefore, when a same gradation patch is detected using colorimetric sensors having difference spectral sensitivities, the detection results are different. To solve this problem, the present exemplary embodiment corrects a variation in the detected values due to the spectral sensitivity characteristic of the colorimetric sensor 10. To make the correction, a reference spectral sensitivity characteristic is stored in, for example, the ROM 403 in the main body of the inkjet recording apparatus 1 in advance, and a spectral sensitivity characteristic of the colorimetric sensor 10 is stored in the colorimetric sensor 10 or in the ROM 403 in the main body of the inkjet recording apparatus 1 in advance. The inkjet recording apparatus 1 acquires the reference spectral sensitivity characteristic and the spectral sensitivity characteristic of the colorimetric sensor 10 by reading them. FIG. 9 is a conceptual diagram illustrating information stored in the ROM 403 of the inkjet recording apparatus 1 and the colorimetric sensor 10. An ink spectral reflection characteristic for each gradation printed on the recording medium, a reference spectral sensitivity characteristic of the light emitting portion, and a reference spectral sensitivity characteristic of the light receiving portion are stored in the ROM 403, which is a storage area of the apparatus main body. The reference spectral sensitivity characteristic means a spectral sensitivity characteristic of a typical colorimetric sensor for performing calibration. It is desirable to set the reference spectral sensitivity characteristic to the median of a variation among elements, but the reference spectral sensitivity characteristic does not necessarily have to be the median. The spectral sensitivity characteristic of the light emitting portion 11 mounted on the colorimetric sensor 10 as first information, and the spectral sensitivity characteristic of the light receiving portion 12 mounted on the colorimetric sensor 10 as second information are stored in the storage area of the colorimetric sensor 10. FIG. 11 schematically illustrates a result of detection performed on gradation patches by a colorimetric sensor having the reference spectral sensitivity characteristic, and a result of detection performed on the same gradation patches by a colorimetric sensor having a different spectral sensitivity characteristic from the reference spectral sensitivity characteristic. A line 240 indicates the result detected by the colorimetric sensor having the reference spectral sensitivity characteristic. A line 250 indicates the result detected by the colorimetric sensor having the different spectral sensitivity characteristic from the reference spectral sensitivity characteristic. Assume that A indicates an ink spectral sensitivity characteristic of a gradation patch, B indicates the reference spectral sensitivity characteristic of the light emitting portion, C indicates the reference spectral sensitivity characteristic of the light receiving portion, D indicates the spectral sensitivity characteristic of the light emitting portion of a colorimetric sensor, and E indicates the spectral sensitivity characteristic of the light receiving portion of the colorimetric sensor.

In this case, an estimated detected value U1 of the colorimetric sensor having the reference spectral sensitivity characteristic can be expressed by equation (1):

$$U1 = \int A \times B \times C \qquad (1)$$

In a case where the light emitting characteristic of the colorimetric sensor is limited to visible light, the integration range may be the visible light.

Further, an estimated detected value U2 of the colorimetric sensor having the different spectral sensitivity characteristic from the reference spectral sensitivity characteristic can be expressed by equation (2):

$$U2 = \int A \times D \times E \qquad (2)$$

Assuming that D2 is a white reference calibration value obtained by detecting the gradation patch printed in step S4-1 using the colorimetric sensor having the different spectral sensitivity characteristic from the reference spectral sensitivity characteristic, the detection result can be corrected by equation (3):

DETECTION RESULT (AFTER CORRECTION)
$$= D2 \times U1/U2 \qquad (3)$$

In this way, the inkjet recording apparatus 1 refers to, by a reference unit in the CPU 401, the reference information stored in the apparatus main body and the individual information stored in the colorimetric sensor 10, and corrects the detection result using the reference information and the individual information, thereby correcting a variation in the detection result due to the individual difference. The light emitting characteristic and the light receiving characteristic as the spectral sensitivity characteristics stored in the colorimetric sensor 10 mounted on the inkjet recording apparatus 1 includes values indicating the light emitting characteristic and the light receiving characteristic of the colorimetric sensor 10. However, the spectral sensitivity characteristics may include information indicating a difference from the reference spectral sensitivity characteristic. In this case, the detection result may be corrected based on the referred difference information.

Figure 12:
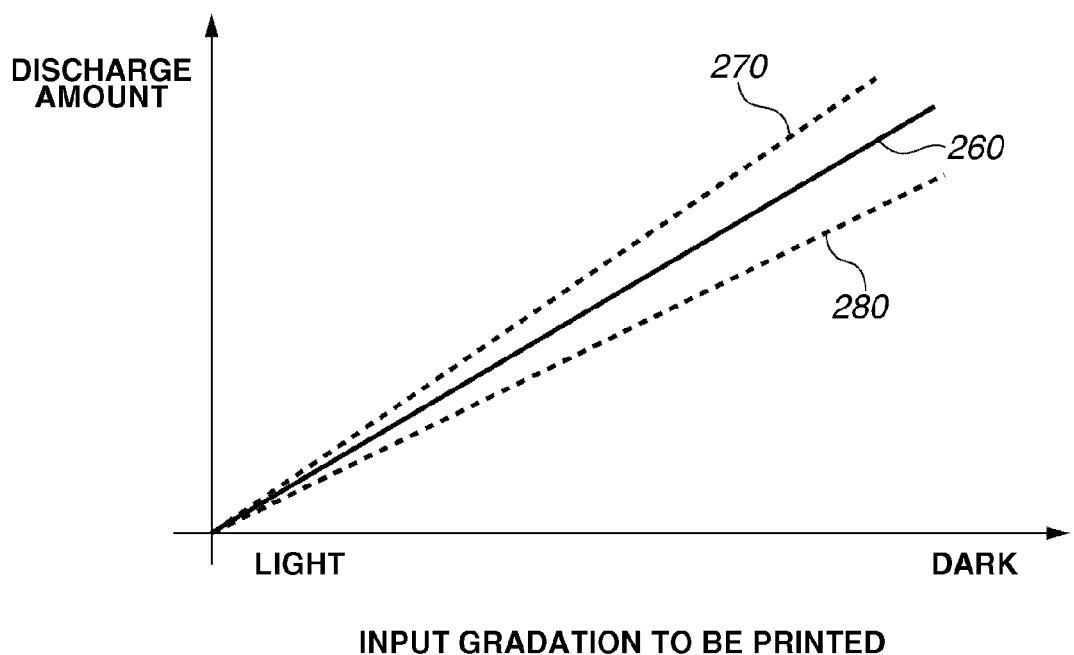
FIG. 12 is a graph illustrating a difference in discharge amount for each of different recording apparatuses.

Next, in step S4-5, the inkjet recording apparatus 1 corrects an ink discharge amount. The inkjet recording apparatus 1 corrects the ink discharge amount from the corrected result of the detection of the printed gradation patches. FIG. 12 schematically illustrates a change in the discharge amount for each recording apparatus. A line 260 indicates a relationship between an input value and a discharge amount with respect to a reference recording apparatus that discharges a standard amount, which is determined as a reference in advance. A line 270 indicates a relationship between an input value and a discharge amount with respect to a recording apparatus, which discharges an amount larger than the discharge amount of the reference recording apparatus when discharging ink based on this signal. A line 280 indicates a relationship between an input value and a discharge amount with respect to a recording apparatus, which discharges an amount smaller than the discharge amount of the reference recording apparatus when discharging ink based on the signal. The inkjet recording apparatus 1 corrects the discharge amount based on the detection result obtained by the correction in the spectral sensitivity characteristic of the colorimetric sensor 10 in step S4-4. In a case where the inkjet recording apparatus 1 detects that the detected printed density is lower than the printed density of the reference recording apparatus, the inkjet recording apparatus 1 corrects an input signal value in such a manner to increase the discharge amount relative to the input value. On the other hand, in a case where the inkjet recording apparatus 1 detects that the printed density is higher, the inkjet recording apparatus 1 corrects the input signal value in such a manner to reduce the discharge amount. Information defining a change of the signal value for the correction may be stored in the ROM 403, and the inkjet recording apparatus 1 may read the information and cause the CPU 401 to perform control in such a manner to change the discharge amount. For the change of the discharge amount, for example, the inkjet recording apparatus 1 can output a pixel value of input image data which is changed based on the correction in step S4-5 in such a manner that the value is transmitted to the recording head 50. The input image data may include ink data indicating a gradation value for each of the colors of inks to be used in printing, Red/Green/Blue (RGB) data indicating a gradation value by an RGB value, and dot data that determines whether a dot is recorded.

By the above-described method, the inkjet recording apparatus 1 corrects a variation in the spectral sensitivity of the colorimetric sensor 10 without using a calibration chart when detecting the densities of printed patches.

Figure 13:
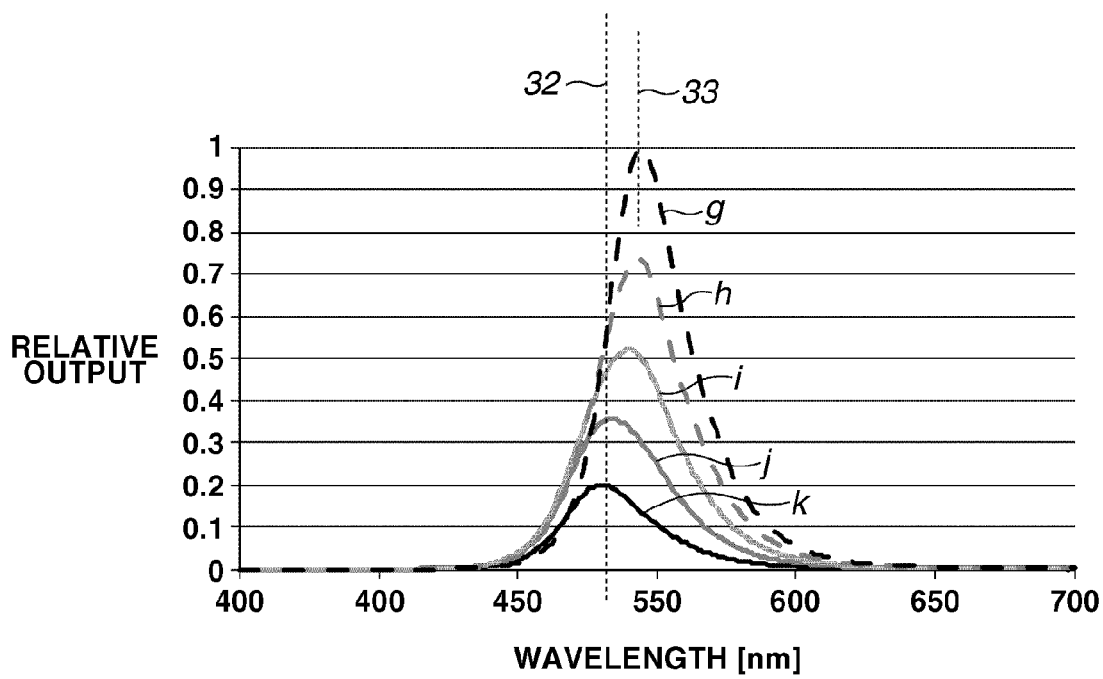
FIG. 13 is a graph illustrating an emission wavelength spectrum for each supplied current.

Next, a method for storing the spectral sensitivity characteristic in the colorimetric sensor 10 will be described. Emission spectrums vary depending on a supplied current even if the spectrums are output from the same light emitting element. FIG. 13 is a conceptual diagram illustrating an emission wavelength spectrum for each supplied current. A line 32 indicates a peak wavelength where an output approximately reaches a peak at spectra k and j corresponding to low currents. A line 33 indicates a peak wavelength where an output approximately reaches a peak at spectra h and g corresponding to high currents. FIG. 13 illustrates how the peak wavelength shifts according to a current amount. It is desirable that the wavelength characteristic of the light emitting element is stored in the colorimetric sensor 10 for each current. A plurality of supplied currents and a plurality of emission spectra are stored in advance. Further, the emission spectrum may be interpolated between the stored currents. For example, an emission spectrum corresponding to a supplied current of 5 mA and an emission spectrum corresponding to a supplied current of 10 mA are stored in the colorimetric sensor 10. When the supplied current is 7.5 mA at the time of detection of a gradation patch, a spectrum corresponding to 7.5 mA is calculated from the emission spectra of 5 mA and 10 mA. As the calculation method, for example, a desired spectrum may be acquired by performing linear interpolation on the currents.

Further, the elements within the colorimetric sensor 10 are identified by the colorimetric sensor 10 itself. According to the present exemplary embodiment, it is unlikely that the light emitting element and the light receiving element are changed independently. Therefore, the spectral sensitivity characteristics of the light emitting element and the light receiving element may be stored as one data. The same applies to the spectral sensitivity characteristics of the reference light emitting element and the reference light receiving element, which are stored in the main body of the inkjet recording apparatus 1.

Further, in a case where a monochromatic light emitting diode (LED) is used as the light emitting portion 11, an optical spectral intensity relatively increases around a peak wavelength (for example, refer to the lines 290 and 300 in FIG. 10). Therefore, information may be stored in the region around the peak wavelength at a short interval, and information may be stored in other wavelength regions at a long interval. More specifically, in a wavelength band where a value of a spectral sensitivity of a measurement unit according to a wavelength is higher than half the value of a peak, values of the spectral sensitivity in a predetermined wavelength range (for example, a range of 30 nm) are stored at 2-nm intervals. On the other hand, in a wavelength band where a value of a spectral sensitivity is equal to or lower than half the value of the peak, values of the spectral sensitivity in the same range (in the present example, 30 nm) are stored at 5-nm intervals. In this way, the number of stored values of the spectral sensitivity is increased around the peak. Needless to say, the emission wavelength of the monochromatic LED is different for each light emission color (for example, R, G, and B), so the wavelength region, in which information is stored at a short interval, varies for each color.

The spectral sensitivity characteristic of the light emitting portion 11 is stored according to the above-described method.

Next, a method for acquiring the ink spectral sensitivity characteristic for each gradation patch printed on a recording medium will be described.

The ink spectral sensitivity characteristic of the gradation patch may be acquired by measuring and storing the ink spectral sensitivity characteristic in the main body of the inkjet recording apparatus 1 in advance. However, this method cannot be used for a recording medium unprepared in advance. Therefore, in this case, a gradation patch printed on the recording medium is measured by a separate measurement device, and is stored in the main body of the inkjet recording apparatus 1. The ink spectral sensitivity characteristic of the gradation patch may be acquired by using the method. The ink spectral sensitivity characteristic of the gradation patch may be acquired by using a colorimetric device capable of acquiring spectral data of visible light. By generating the data in a single inkjet recording apparatus, it is possible to develop the same data to a plurality of inkjet recording apparatuses. Therefore, for example, it is also possible to develop data even to a plurality of inkjet recording apparatuses without a colorimetric device mounted thereon, based on a single inkjet recording apparatus with a colorimetric device mounted thereon.

The ink spectral sensitivity characteristic is acquired for each gradation patch printed on a recording medium according to the above-described method.

It is also possible to generate an image processing program that causes a computer to execute the above-described image processing method, and realize the above-described exemplary embodiment by using this computer.

According to the above-described exemplary embodiment of the present invention, it is possible to provide an apparatus and method capable of easily correcting a variation in an optical characteristic of a unit for measuring a test pattern.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). Further, the program may be executed by a single computer, or a plurality of computers in cooperation with one another.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-102479 filed Apr. 27, 2012, which is hereby incorporated by reference herein in its entirety.

What is claimed is:

1. A recording apparatus comprising:
   a recording head for performing recording on a recording medium by applying a recording material to the recording medium;
   a measurement unit configured to read a patch recorded on the recording medium including light emitting portion configured to emit light to the recording medium, and a light receiving portion configured to receive the light emitted by the light emitting portion and reflected by the recording medium by the recording head and to optically measure a density of the patch;

an acquisition unit configured to acquire information indicating a spectral sensitivity of the measurement unit and information indicating a reference spectral sensitivity of a reference measurement unit including a light emitting characteristic of the reference measurement unit and a light receiving characteristic of the reference measurement unit; and a determination unit configured to determine an amount by which the recording material is to be applied from the recording head, based on the reading result of the patch measured by the measurement unit and the spectral sensitivity of the measurement unit indicated by the information acquired by the acquisition unit and the reference spectral sensitivity indicated by the information acquired by the acquisition unit.

2. The recording apparatus according to claim 1, wherein the spectral sensitivity of the measurement unit includes a light emitting characteristic of the light emitting portion.

3. The recording apparatus according to claim 1, wherein the spectral sensitivity of the measurement unit includes a light receiving characteristic of the light receiving portion.

4. The recording apparatus according to claim 1, further comprising a storage unit configured to store at least one of information indicating the spectral sensitivity of the measurement unit and information indicating the reference spectral sensitivity of the reference measurement unit, wherein the acquisition unit acquires at least one of the information indicating the spectral sensitivity of the measurement unit and information indicating he reference spectral sensitivity stored in the storage unit.

5. The recording apparatus according to claim 4, wherein the spectral sensitivity includes values of spectral sensitivity of the measurement unit corresponding to wavelengths, and wherein, in the information indicating the spectral sensitivity of the measurement unit stored in the storage unit, a number of values of spectral sensitivity within a predetermined wavelength range in a wavelength band where the spectral sensitivity is higher than a predetermined value is greater than the number of values of spectral sensitivity within the predetermined wavelength range in a wavelength band where the spectral sensitivity is equal to or lower than the predetermined value.

6. The recording apparatus according to claim 1, further comprising a storage unit configured to store the information indicating the reference spectral sensitivity of reference measurement unit, and the measurement unit comprises a memory configured to store the information indicating the spectral sensitivity of the measurement unit and the acquisition unit acquires the information indicating the spectral sensitivity of the measurement unit in the memory and the information indicating the reference spectral sensitivity stored in the storage unit.

7. The recording apparatus according to claim 1, wherein the information indicating the spectral sensitivity of the measurement unit is stored in a memory of the measurement unit, and the acquisition acquires, the information indicating the spectral sensitivity of the measurement unit stored in the memory.

8. The recording apparatus according to claim 1, wherein the measurement unit comprises a memory storing first information indicating the light emitting characteristic of the light emitting portion and second information indicating the light receiving characteristic of the light receiving portion as the spectral sensitivity of the measurement unit and the acquisition unit acquires the first and second information stored in the storing unit as the information indicating a spectral sensitivity of the measurement unit.

9. The recording apparatus according to claim 1, wherein the determining unit corrects the reading result of the patch measured by the measurement unit based on the spectral sensitivity of the measurement unit and the reference spectral sensitivity indicated by the information acquired by the acquisition unit, and determines amount by which the recording material based on the corrected reading result of the patch.

10. An image processing method comprising:

reading a patch recorded on a recording medium including light emitting portion configured to emit light to the recording medium, and a light receiving portion configured to receive the light emitted by the light emitting portion and reflected by the recording medium by a recording head for performing recording on the recording medium by applying a recording material to the recording medium, and optically measuring a density of the patch via a measurement unit;

acquiring information indicating a spectral sensitivity of the measurement unit and information indicating a reference spectral sensitivity of a reference measurement unit including a light emitting characteristic of the reference measurement unit and a light receiving characteristic of the reference measurement unit; and determining an amount by which the recording material is to be applied from the recording head, based on the reading result of the patch measured by the measurement unit indicated by the acquired information and the spectral sensitivity of the measurement unit and the references spectral sensitivity indicated by the acquired information.

11. The image processing method according to claim 10, wherein the spectral sensitivity of the measurement unit includes a light emitting characteristic of the light emitting portion.

12. The image processing method according to claim 10, wherein the spectral sensitivity of the measurement unit includes a light receiving characteristic of the light receiving portion.

13. The image processing method according to claim 10, wherein the spectral sensitivity includes values of spectral sensitivity of the measurement unit corresponding to wavelengths, and wherein, in the information indicating the spectral sensitivity of the measurement unit, a number of values of spectral sensitivity within a predetermined wavelength range in a wavelength band where the spectral sensitivity is higher than a predetermined value is greater than the number of values of spectral sensitivity within the predetermined wavelength range in a wavelength band where the spectral sensitivity is equal to or lower than the predetermined value.

14. The image processing method according to claim 10, wherein the determining includes correcting the reading result of the patch measured by the measurement unit based on the spectral sensitivity of the measurement unit and the reference spectral sensitivity indicated by the acquired information, and determines amount by which the recording material based on the corrected reading result of the patch.

15. A non-transitory storage medium storing a program to cause a computer to execute an image processing method comprising:

reading a patch recorded on a recording medium including light emitting portion configured to emit light to the recording medium, and a light receiving portion configured to receive the light emitted by the light emitting portion and reflected by the recording medium by a recording head for performing recording on the recording medium by applying a recording material to the recording medium, and optically measuring a density of the patch via a measurement unit;

acquiring information indicating a spectral sensitivity of the measurement unit and information indicating a reference spectral sensitivity of a reference measurement unit including a light emitting characteristic of the reference measurement unit and a light receiving characteristic of the reference measurement unit; and determining an amount by which the recording material is to be applied from the recording head, based on the reading result of the patch measured by the measurement unit and the spectral sensitivity of the measurement unit indicated by the acquired information and the references spectral sensitivity indicated by the acquired information.

16. The storage medium according to claim 15, wherein the spectral sensitivity of the measurement unit includes a light emitting characteristic of the light emitting portion.

17. The storage medium according to claim 15, wherein the spectral sensitivity of the measurement unit includes a light receiving characteristic of the light receiving portion.

18. The storage medium according to claim 15,
wherein the spectral sensitivity includes values of spectral sensitivity of the measurement unit corresponding to wavelengths, and
wherein, in the information indicating the spectral sensitivity of the measurement unit, a number of values of spectral sensitivity within a predetermined wavelength range in a wavelength band where the spectral sensitivity is higher than a predetermined value is greater than the number of values of spectral sensitvity is equal to or lower than the predetermined value.

19. A recording apparatus comprising:
a recording head for performing recording on a recording medium by applying a recording material to the recording medium;
a measurement unit configured to read a patch recorded on the recording medium including a light emitting portion configured to emit light to the recording medium, and a light receiving portion configured to receive the light emitted by the light emitting portion and reflected by the recording medium by the recording head and to optically measure a density of the patch;
an acquisition unit configured to acquire information indicating a spectral sensitivity of the measurement unit and information indicating a reference spectral sensitivity of a reference measurement unit including a light emitting characteristic of the reference measurement unit and a light receiving characteristic of the reference measurement unit; and
a determination unit configured to determine an amount by which the recording material is to be applied from the recording head, based on the reading result of the patch measured by the measurement unit and the spectral sensitivity of the measurement unit indicated by the information acquired by the acquisition unit and the reference spectral sensitivity indicated by the information acquired by the acquisition unit,
a storage unit configured to store the information indicating the reference spectral sensitivity of reference measurement unit, and the measurement unit comprises a memory configured to store the information indicating the spectral sensitivity of the measurement unit and the acquisition unit acquires the information indicating the spectral sensitivity of the measurement unit in the memory and the information indicating the reference spectral sensitivity stored in the storage unit.

* * * * *